United States Patent [19]

Tatum

[11] 3,779,722

[45] Dec. 18, 1973

[54] PROCESS FOR DESULFURIZING FUEL

[76] Inventor: David Tatum, 325 Dartmouth Ave., Swarthmore, Pa. 19081

[22] Filed: Feb. 23, 1972

[21] Appl. No.: 228,617

[52] U.S. Cl. .......................... 44/1 R, 201/17, 208/8
[51] Int. Cl. ....... C10l 9/10, C10b 57/00, C10a 1/00
[58] Field of Search .................. 44/1 R; 208/8, 214; 201/17; 423/461

[56] References Cited
UNITED STATES PATENTS

| | | | |
|---|---|---|---|
| 580,652 | 4/1897 | Schiller | 208/214 |
| 2,202,901 | 6/1940 | Dreyfus | 208/8 X |
| 2,878,163 | 3/1959 | Hutchings | 423/461 |
| 3,387,941 | 6/1968 | Murphy et al. | 201/17 X |
| 3,640,016 | 2/1972 | Lee et al. | 44/1 R |

*Primary Examiner*—C. F. Dees
*Attorney*—Edward M. Farrell

[57] ABSTRACT

A process for desulfurizing fuel includes producing spaced vortices of molten metal and passing the fuel with hydrogen donor material and a flux material through the spaced vortices to provide an interaction there-between.

6 Claims, 4 Drawing Figures

PROCESS FOR DESULFURIZING FUEL

The present invention relates to a new and improved process for treating liquid or solid fossil fuel to remove deleterious noncarbonaceous compounds and constituents, and more particularly sulfur, sulfides, organically bound sulfur, sulfur of protein origin, pyrites, and inorganic compounds. The removal of deleterious noncarbonaceous substances from liquid or solid fossil fuel improves fuel for use in metallurgical processing, for use in energy release by oxidation without pollution, and for economical gasification.

It has long been a difficult problem economically to remove non-carbonaceous constituent substances from liquid or solid fuel by thermal refining, hydrorefining, by solvent extraction and by other processes. Volatile deleterious substances containing noncarbonaceous constituents carry-over with the useful vaporized carbonaceous volatiles while non-volatile ash forming deleterious noncarbonaceous constituents tend to concentrate in otherwise useful residual bottom fractions and also create fly ash.

Prior processes for removing deleterious noncarbonaceous constituents from liquid or solid fossil fuel employ voluminous extended phases, such as required in solvent extraction, washing, vapor phase reaction, hydrorefining, fluidized bed reaction, sink/float, gas scrubbing, extended surface contact catalysis and like large specific volume techniques. Typically the prior processes encounter channeling, stagnant zones and other faults in operating characteristics that permit some portion of untreated feedstock to pass through the working vessels to contaminate the effluent product. Treatment of extended phase feedstock with reactants also in extended phases assures that in some zones of the charge more work will be performed on the resident materials than will be performed on resident materials in other zones. There is a work distribution probability in extended phase systems that operates to require some zones to be overworked in order that no dead zones will occur and all zones will be sufficiently worked. This requirement to overwork some feedstock increases operating costs and results in erratic quality distribution. Treatment and reaction of materials in extended phase operations requires relatively costly large scale structures.

It is the principle object of this invention to provide an intensive phase process to treat liquid or solid fossil fuel to obtain improvements in quality and efficiency in operation in removal of deleterious noncarbonaceous constituents not hitherto available by extended phase and other processes.

Also, it is an object of this invention to provide in a process for improving liquid or solid fossil fuel means for cleanly separating accept product streams from reject waste streams.

Another object of this invention is to provide a process for improving the useful quality of liquid or solid fossil fuel.

An additional object of this invention is to provide in a process an operation for low cost separating vaporized materials from nonvaporized accept fly.

In accordance with the present invention, a process for removing sulfur and inorganic constituents from fuel is provided. Sources of fuel, hydrogen donor material, molten metal, metal alloy and flux material are provided. Fuel, hydrogen donor material, molten metal and flux material are injected into a comminutor. The molten metal is applied to the comminutor to produce a shearing space energized by vortex flows within the comminutor. The fuel, hydrogen donor material and flux materials are injected under pressure into the shearing space between the hot molten vortex flows to produce fuel particulates, char and attritus. Work in this shearing space causes the temperature of the fuel particulates, hydrogen donor material, char and attritus to rise at a rate in excess of 1,000°F per second. The high rate of temperature rise degrades the fuel, hydrogen donor material, particulates, char and attritus into small molecular weight species to free inorganic constituents therefrom. The sulfur constituents, fuel particulates, char, attritus and inorganic constituents are then separately removed from the comminutor.

Other objects and advantages of the present invention will be apparent and suggest themselves to those skilled in the art from a reading of the following specification and claims, in conjunction with accompanying drawing, in which:

Figure 1:
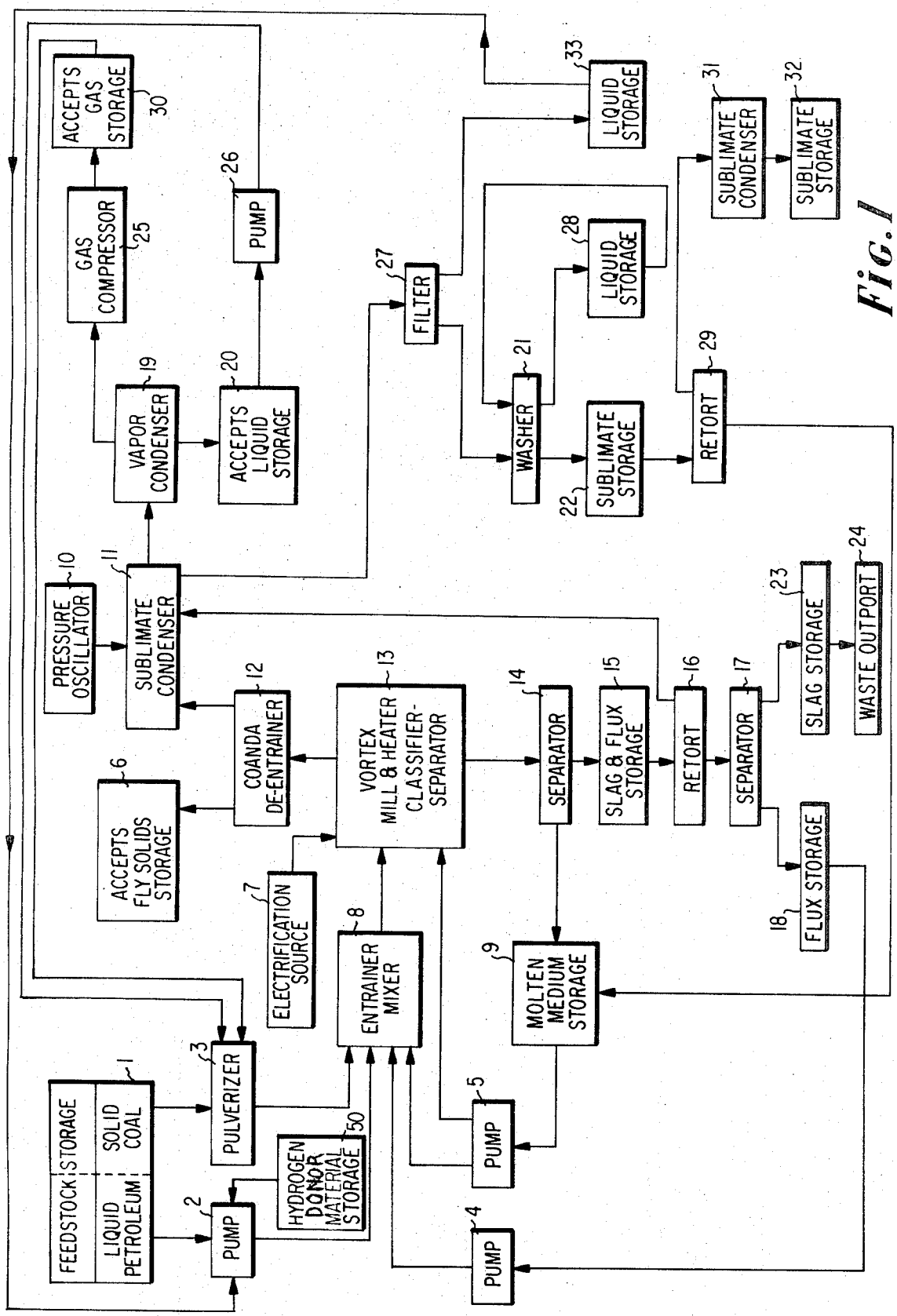
FIG. 1 is a block diagram illustrating one embodiment of the present invention.

Referring to FIG. 1 of the drawing, fossil fuel is stored in a feedstock storage 1, which may store either liquid petroleum or solid coal. When the fuel is liquid petroleum, it passes through a pump to an entrainer mixer 8. When the fuel is solid coal, it is passed through a pulverizer 3 to the entrainer mixer 8. At the same time that the fossil fuel is passed through the entrainer mixer 8, high velocity streams of flux and hydrogen donor materials are also applied to the entrainer mixer 8. A hydrogen donor material from a source 50 is forced into the entrainer mixer 8 by pump 2. A flux material is also forced into the entrainer mixer 8 by pump 4.

The entrained fossil fuel is injected at high velocity by the force of the flux and hydrogen donor material into a comminutor unit 13, which may be considered as a vortex mill, heater and classifier separator. At the same time that fuel, hydrogen donor material and flux are injected into the unit 13, a molten working metal, alloy, or other medium is also injected. The fuel, hydrogen donor material and flux are injected radially into the unit. The molten working metal, alloy or other medium is injected tangentially into the unit to produce a pair of counter-acting vortices with a shear space therebetween. The fuel, hydrogen donor material, and flux are applied between the spaced vortices of the working metal. The flux ingredients function as fast acting bond scission materials while the hydrogen donor material adjusts the carbon/hydrogen ratio in the process to reduce coking. The unit 13 is illustrated in somewhat greater detail in FIGS. 2, 3, and 4.

Figure 2:
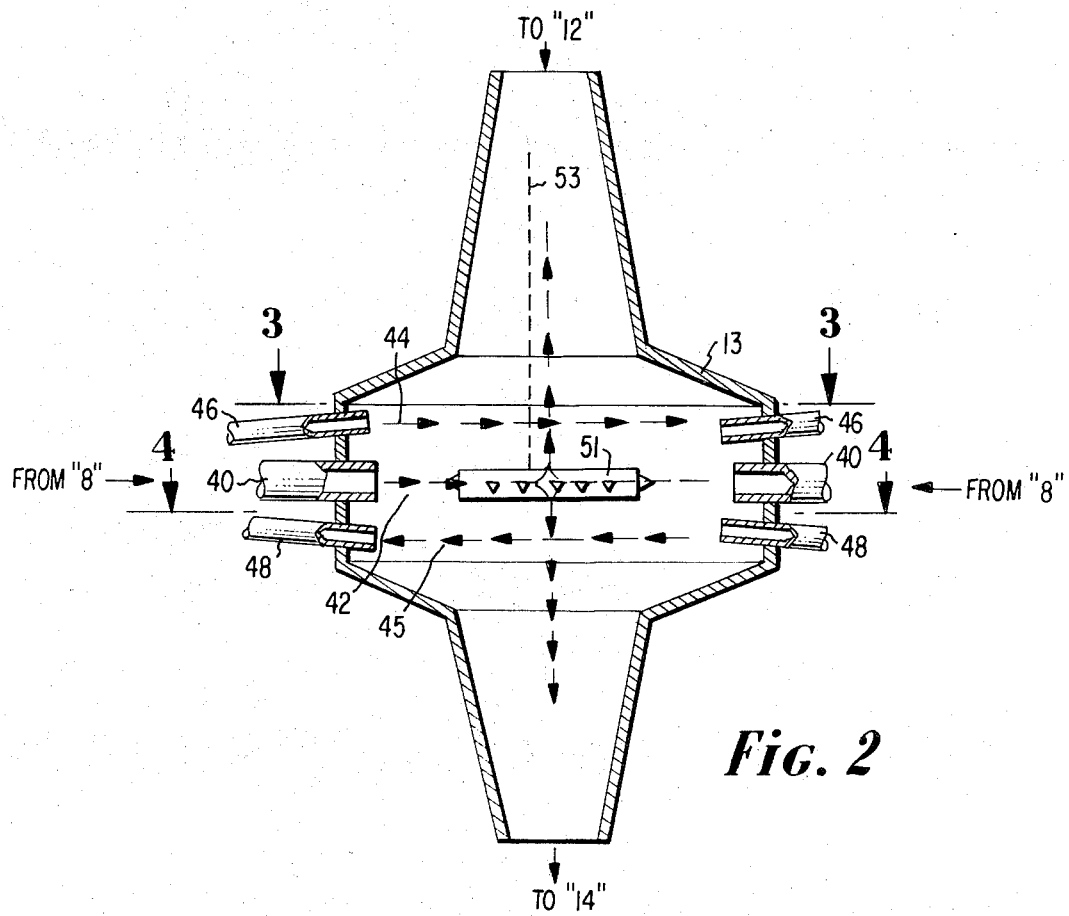
FIG. 2 is a cross-sectional view illustrating one of the units illustrated by one of the blocks of FIG. 1.

As illustrated in FIG. 2, the fuel, hydrogen donor material and flux enter in a radial direction into the unit 13 by means of a plurality of spaced inlets 40. Arrows 42 illustrate generally the direction of flow of the fuel, hydrogen donor material and flux when it enters the unit 13. Only two inlets 40 are illustrated, it being understood that more inlets such as eight or more may be employed.

Figure 3:
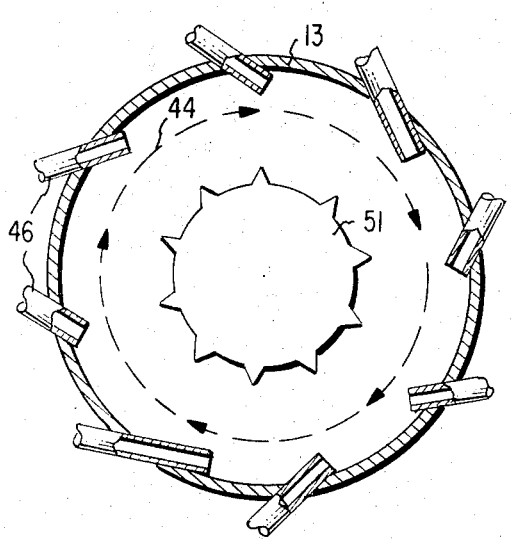
FIG. 3 is a cross-sectional view taken along lines 3—3 of FIG. 2.
Figure 4:
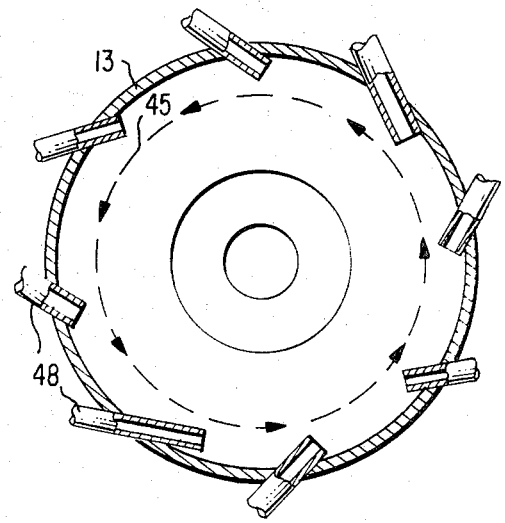
FIG. 4 is a cross-sectional view taken along lines 4—4 of FIG. 2.

The working molten metal 15 is injected into the unit 13 by means of plurality of spaced inlets 46 and 48. The inlets are disposed to inject the molten metal tangentially of the inner chamber 48, which may be circular in shape. Eight, or any convenient number, of inlets 46 and 48 may be employed. Injecting the molten metal tangentially into the chamber 48 through inlets 46 and 48 creates a pair of vortices moving in the directions of the arrows 44 and 45, as illustrated in FIGS. 3 and 4. It is seen that the fuel, hydrogen donor material and flux are injected in the space between the vortices of the molten metal to permit interaction therebetween.

The velocities of the vortices are adjusted by control of the pressure and volume of the injected molten metal. Typically the average surface speed may range from 3,000 to 12,000 surface feet per minute with a useful diameter that may range from 10 to 40 inches. The power required to drive the vortices at useful speeds may range from 25 to 150 horsepower. Factors such as percentage nonmolten material occluded in the vortex system, and the viscosity which is determined by the presence of eutectics and by the temperature to a large extent establish the power required for a given output. An AC modulated DC electric current from electrification source 7 is applied through an electric conductor represented by a dotted line 53 to an anode 51 centrally positioned within the chamber 48 at the interface containing fuel, hydrogen donor materials and flux materials in the working zone between the counteracting vortices of molten metal working medium to augment the activation energy for the reactions taking place within the interacting zone. The molten metal provides the cathode for the electrical circuit. The DC voltage employed may, for example, range between 12 to 80 volts DC. The modulating AC frequency may range between 5 to 45 kilocycles. The amperage may vary in accordance with the size of the unit. The wave form of the AC may vary to control and match impedances during operation.

The counteracting vortices 44 and 45 of the molten metal create centrifugal forces and primary and secondary circulation patterns. These forces and circulation patterns carry the comminuted fuel, hydrogen donor materials and flux particles at medium slip ratios and deform, elongate, decrepitate, fracture and scour clean to provide ever fresh surfaces of the fuel particulates, hydrogen donor materials and flux extremely rapidly to raise the temperature of these materials. This extremely rapid rise in temperature promotes chemical bond cleavage and chemical bond scission at S-S and C-S chemical bonds so that desulfurization reaction and the fluxing of inorganic constituents in the fossil fuel is readily accomplished by ionic chemical reactions.

The contact shearing zone between the counteracting vortices contains chemically active metal vapor and free radical sulfur constituents that result from the extremely rapid temperature rise and concomitant pyrolysis and the low static pressure generated by the high speed fluid flow. The presence of the hydrogen donor material, typically water, formalin, aldehydes, alcohols, pyridine and carbonium ion forming compounds such as, in example, trimethyl boron, isobutance, trimethylamine and the like, prevents resinification to asphalts, pitches, and tars which otherwise would result from the rebonding and polymerization promoting activity of the sulfur containing free radicals acting on the freshly created unsaturated covalent bonds and chain end openings.

The speed of extremely rapid desulfurization results from the ionic nature of the reactants present in the contact shearing zone as well as the presence of the ionic augmenting electric field.

Fuel volatiles present in the vortex worked materials flash into vapor phase. Reactive sulfur ingredients in said vapor will attack the active metal vapor by oxidation to form sublimate metal sulfides. Because these vapor materials are not responsive to centrifugal fields, they move rapidly to the axes of the vortices 44 and 45, and are led out of the unit 13 as an overhead stream into a Coanda de-entrainer 12.

The liquid fill of molten metal within the vortices 44 and 45 overflows at the central axes of the vortices and moves downward as a bottom liquid outflow and passes out of the unit 13 into a separator 14. Separator 14 acts to separate dense molten liquid working medium from less dense molten slag and flux mixture. The molten liquid working medium is led from separator 14 to molten working medium storage 9. The molten working medium is then recirculated in the process system. The temperature of the molten working medium is regulated by a heater, not illustrated, that operates on the charge within the molten liquid working medium storage 9.

The slag and flux mixture portion separated at separator 14 is led to a slag and flux storage 15. From the slag and flux storage 15, the slag and flux mixture is led to retort 16. At retort 16, volatile sublimate are volatilized and led as an overhead flow to sublimate condenser 11. From retort 16, liquid mixture of the slag and flux is led to separator 17. Because slag has a different viscosity than flux, the separator 17 acts to remove slag as the more viscous substance. The more viscous slag is then led to a slag storage 23. From the slag storage 23 the slag is led to waste outport 24 for refining, recovery and utilization.

Because flux is less viscous than the slag as separated from the separator 17, the flux is led to flux storage 18. At flux storage 18 the temperature of the flux is regulated by an ttached heater attached illustrated) and the flux is recirculated in the procss by means of pump 4.

As previously mentioned, the overhead volatiles and solid fly particles stream from the unit 13 are led to the Coanda de-entrainer 12. Here the fly solids, being responsive to inertial forces, are de-entrained from the noncondensed portions of the flow which are not responsive to inertial forces. The fly solids are char or hydrocarbon particles and are led to accepts fly solid storage 6. The noncondensed volatile stream is led from the Coanda de-entrainer 12 to a sublimate condenser 11. At the sublimate condenser a pressure oscillator 10 acts to apply pressure changes within the sublimate condenser 11. These pressures may be in the form of a series of square waves at frequencies that accelerate nucleation and condensation within the chamber of the sublimate condenser 11. The condensate from the sublimate condenser 11 is led to filter 27.

The condensate from the sublimate condenser 11 contains solids and liquids. In filter 27 the liquids are expressed and led to a liquid storage 33. The filter cake from filter 27 is led to a washer 21 and then to a liquid storage 28. Liquid from liquid storage 28 is circulated through washer 21 to clean the filter cake. The washed filter cake from washer 21 is led through a sublimate storage 22 to a retort 29. In retort 29, the washed filter cake is volatilized and liquid molten working medium recovered. The volatilized stream from retort 29 is led to a sublimate condenser 31. From the sublimate condenser 31 the condensed sublimate is led to a sublimate storage 32. The recovered stream of molten working medium is led from the retort 29 to molten working medium storage 9. The liquid in liquid storage 33 is led to pump 2 for recirculation in the process system.

Volatiles not condensed in the sublimate condenser 11 are led to a vapor condenser 19. Condensate from the vapor condenser 19 is led to accepts liquid storage 20. Some liquid is needed to provide material to act as liquid vehicle within the process system is led from the accepts liquid storage 20 to a pump 26. From pump 26 pressurized liquid is led to pulverizer 3 for recirculation.

Noncondensable gases and vapors in vapor condenser 19 are led to a gas compressor 25. From the gas compressor 25 compressed gases and vapors are led to accepts gas storage 30. Some compressed gas and compressed vapor needed to reduce viscosity of feedstock streams is led from accepts gas storage 30 to pulverizer 3.

The previous description has involved the inclusion of some devices well known to those skilled in the art. For this reason, details involving many of the components illustrated in the form of blocks are not given.

A description of the mechanical portions necessary to carry out the process of the invention has been presented without specific references to the types of materials involved. While various different types of flux and working metals may be used, some are preferred over others.

The molten working medium fluid which creates the vortices 44 and 45 may comprise metals, metal alloys, metal halides, eutectics, carbonates of alkaline or alkaline earth metals, oxides of rare earth, alkaline or alkaline earth metals that have the property of forming sublimates with sulfur, have the property of dissolving sulfides, have the property of splitting sulfur linkages and bonds as in depilatory, dehairing or proteolytic unhairing reactions, have the property of fluxing metal sulfides and oxides, have the property of generating free electrons under tribomechanical forces, have the property of forming stable sulfur containing ores, have the property of forming sulfides having low solubility products at a temperature range between 500°F to 1,200°F, have the property of forming volatile sulfide sublimates that condense readily upon increasing the pressure of the volatized sublimate, have the property of assuming various valances to form a series of sulfide molecular compounds each having different numbers of bound sulfur atoms, having the property of being readily oxidized by sulfide ions in molten liquids.

The molten working medium is made up of several necessary types of ingredients.

Zinc is the first important ingredient and should be in the range of 60 to 85 percent, preferably 80 percent. All percentages being by weight.

The second ingredient is lithium metal alloyed to the zinc and should be in the range of 5 to 10 percent, preferably 8 percent.

The third ingredient is cesium metal alloyed to the zinc-lithium and should be in the range of 1.5 to 3.5 percent, preferably 2.0 percent.

The fourth ingredient is potassium or sodium metal and should be in the range of 2.0 to 13.0 percent, preferably in the range of 8.5 percent.

In addition it is important to include a molten flux consisting of oxides of potassium, sodium and cesium, 65 percent sodium, 20 percent potassium, 3 percent cesium and 12 percent lower sulfide sodium being a typical proportioning of ingredients.

Trace quantities of sulfides, oxides, iodides and salts of mercury, lead silver, copper, arsenic phosphorous, and the like, in the flux promote the rate of ionic desulfurization activity.

The quantity of flux should be 10 percent of the flow by weight of the fuel injected into the molten metal working medium.

When performing processes, in a closed vessel containing the vortices of molten metals, hydrogen donor materials, the flux and the injected fuel, that evaporation of volatiles from the hydrogen donor materials and the fuel will build up pressures between zero and 100 psi.

The electrification source 7 augments the transfer of ionic materials from the fuel to the molten working medium. The molten flux provides the electrons necessary for rapid reaction. Conductive electrode surfaces are positioned along the walls of the vortex cavity to provide the ohmic bond to the molten vortices 44 and 46 so that shear zones at the interface between vortices will become electrically active. Molten metal is nonpolar but conductive, while flux and slag are ionic and somewhat less conductive. The nonconductive nonpolar fuel is dielectrically strained by the action of the nonhomogeneous electric fields within the vortices and its ionic as well as its covalent bonded constituents become energized. Sulfur bond cleavage by the alkali metal oxide and carbon bond cleavage by the lithium metal releases the sulfur which then is in an actively ionized state. The ionic sulfur reacts with sodium, cesium and potassium present which then is converted by zinc vapor to the stable sphalerite, zinc sulfide, which sublimes and issues from the vortex as not being a state responding to centrifugal forces.

What is claimed is:

1. A process for removing sulfur and inorganic constituents from fuel comprising the steps of providing comminuting means for said fuel, providing sources of fuel, molten metal, hydrogen donor material and flux material, applying under pressure said molten metal to said comminuting means to produce a shearing space energized by vortex flow within said comminuting means, injecting under pressure said fuel, hydrogen donor material and said flux material into said shearing space to produce fuel particulates, char and attritus to increase the temperature of said fuel particulates, char and attritus at a rate in excess of 1000°F per second to degrade said particulates, char and attritus into small molecular weight species to free inorganic constituents therefrom, and separately removing said sulfur constituents, fuel particulates, char, attritus and inorganic constituents from said comminuting means.

2. A process as set forth in claim 1 wherein the step of injecting under pressure further includes the step of producing first and second spaced vortices in proximity to said shearing space.

3. A process as set forth in claim 2 wherein said step of removing said sulfur constituents comprises the step of volatilizing said sulfur constituents by an ionic reaction.

4. A process as set forth in claim 3 wherein an additional step is provided of separating said char and fuel particulates from volatilized sulfur constituents.

5. A process as set forth in claim 4 wherein additional steps are provided for applying said volatilized sulfur constituents to a variable pressure condenser to condense said volatilized sulfur constituents.

6. A process as set forth in claim 2 wherein said shearing space is energized by counter flowing vortex streams.

* * * * *